United States Patent
Kawai

(10) Patent No.: US 10,177,370 B2
(45) Date of Patent: *Jan. 8, 2019

(54) POSITIVE ELECTRODE FOR LITHIUM ION SECONDARY BATTERY AND LITHIUM ION SECONDARY BATTERY USING THE SAME

(71) Applicant: Murata Manufacturing Co., Ltd., Nagaokakyo-shi, Kyoto-fu (JP)

(72) Inventor: Toru Kawai, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 80 days.

This patent is subject to a terminal disclaimer.

(21) Appl. No.: 15/452,965

(22) Filed: Mar. 8, 2017

(65) Prior Publication Data

US 2017/0179473 A1 Jun. 22, 2017

Related U.S. Application Data

(63) Continuation of application No. PCT/JP2015/073498, filed on Aug. 21, 2015.

(30) Foreign Application Priority Data

Sep. 26, 2014 (JP) .................... 2014-196802

(51) Int. Cl.
| | |
|---|---|
| *H01M 4/36* | (2006.01) |
| *H01M 4/131* | (2010.01) |
| *H01M 4/505* | (2010.01) |
| *H01M 4/525* | (2010.01) |
| *H01M 4/62* | (2006.01) |
| *H01M 10/0525* | (2010.01) |
| *H01M 4/02* | (2006.01) |

(52) U.S. Cl.
CPC .......... *H01M 4/364* (2013.01); *H01M 4/131* (2013.01); *H01M 4/505* (2013.01); *H01M 4/525* (2013.01); *H01M 4/625* (2013.01); *H01M 10/0525* (2013.01); *H01M 2004/028* (2013.01)

(58) Field of Classification Search
CPC ...... H01M 4/131; H01M 4/364; H01M 4/505; H01M 4/525; H01M 4/625; H01M 2004/028; H01M 10/0525
See application file for complete search history.

(56) References Cited

FOREIGN PATENT DOCUMENTS

| | | |
|---|---|---|
| JP | 2005-158721 A | 6/2005 |
| JP | 2011-129442 A | 6/2011 |

OTHER PUBLICATIONS

International Search Report issued in International Application No. PCT/JP2015/073498, dated Nov. 17, 2015.
Written Opinion of the International Searching Authority issued in International Application No. PCT/JP2015/073498, dated Nov. 17, 2015.

*Primary Examiner* — Brittany L Raymond
(74) *Attorney, Agent, or Firm* — Arent Fox LLP

(57) ABSTRACT

A positive electrode for a lithium ion secondary battery. The positive electrode includes a positive electrode combination material having a positive electrode active material that produces a potential of 4.5 V or higher on the basis of metal lithium, a first conduction aid of carbon black, a second conduction aid of non-graphitizable carbon, and a binder. A ratio (SC1/SC2) of a surface area SC1 of the first conduction aid to a surface area SC2 of the second conduction aid is 6.5 to 70, and a sum SE of a surface area SA of the positive electrode active material in the positive electrode combination material and a surface area SC of the first conduction aid and the second conduction aid is 90 $cm^2/cm^2$ to 400 $cm^2/cm^2$ or less per unit coated area of the positive electrode combination material.

9 Claims, No Drawings

POSITIVE ELECTRODE FOR LITHIUM ION SECONDARY BATTERY AND LITHIUM ION SECONDARY BATTERY USING THE SAME

CROSS REFERENCE TO RELATED APPLICATIONS

The present application is a continuation of International application No. PCT/JP2015/073498, filed Aug. 21, 2015, which claims priority to Japanese Patent Application No. 2014-196802, filed Sep. 26, 2014, the entire contents of each of which are incorporated herein by reference.

FIELD OF THE INVENTION

The present invention relates to a lithium ion secondary battery, and more particularly, to a positive electrode constituting a lithium ion secondary battery, and a lithium ion secondary battery using the positive electrode.

BACKGROUND OF THE INVENTION

In recent years, the reduction in size and weight for cellular phones, laptop computers, and the like has progressed rapidly, and batteries as power sources for driving the phones, the computers, and the like have been required to have higher capacities. Further, under such circumstances, lithium ion secondary batteries have been widely used as power sources.

Further, as a positive electrode for use in such a lithium ion secondary battery, a positive electrode has been proposed that has a positive electrode combination material including a positive electrode active material that produces a potential of 4.5 V or higher on the basis of metal lithium, a conduction aid, and a binder, wherein the conduction aid has non-graphitizable carbon and carbon black, and a ratio (SC/SA) of a surface area SC of the conduction aid in the positive electrode combination material to a surface area SA of the positive electrode active material therein is 0.5 or more and 2.5 or less; and a lithium ion secondary battery using the positive electrode (see Patent Document 1).

Further, the electrode configured as mentioned above is supposed to be capable of suppressing, in the positive electrode active material that produces a potential of 4.5 V or higher, a decrease in coulombic efficiency due to oxidative decomposition of a solvent in a non-aqueous electrolytic solution, cell bulge due to gas generation therein, and cycle characteristic degradation due to expansion and contraction of graphite as a conduction aid.

However, when non-graphitizable carbon that is lower in electron conductivity than carbon black and graphite is used as the conduction aid, degradation is caused in the charge/discharge rate characteristics of the positive electrode.

Therefore, the positive electrode for a lithium ion secondary battery using the positive electrode active material that produces a potential of 4.5 V or higher has a problem that it is difficult to achieve a balance between great charge/discharge rate characteristics and inhibited oxidative decomposition of the solvent in the non-aqueous electrolytic solution.

Patent Document 1: Japanese Patent Application Laid-Open No. 2011-129442

SUMMARY OF THE INVENTION

The present invention is intended to solve the problem mentioned above, and an object of the present invention is to provide a positive electrode for a lithium ion secondary battery which is useful for constituting a lithium ion secondary battery with great charge/discharge rate characteristics and with the ability to inhibit oxidative decomposition of a non-aqueous electrolytic solution, and a lithium ion secondary battery using the positive electrode.

In order to solve the problem mentioned above, the positive electrode for a lithium ion secondary battery according to the present invention is a positive electrode for a lithium ion secondary battery including a positive electrode combination material including a positive electrode active material that produces a potential of 4.5 V or higher on the basis of metal lithium, a conduction aid, and a binder. The conduction aid has a first conduction aid composed of carbon black and a second conduction aid composed of non-graphitizable carbon, a ratio (SC1/SC2) of a surface area SC1 of the first conduction aid in the positive electrode combination material to a surface area SC2 of the second conduction aid therein is 6.5 or more and 70 or less, and a sum SE of a surface area SA of the positive electrode active material in the positive electrode combination material and a surface area SC of the conduction aid therein is 90 $cm^2/cm^2$ or more and 400 $cm^2/cm^2$ or less per unit coated area of the positive electrode combination material.

In addition, in the positive electrode for a lithium ion secondary battery according to the present invention, a ratio (SC/SA) of the surface area SC of the conduction aid to the surface area SA of the positive electrode active material is preferably 2.5 or more and 10 or less.

The use of the positive electrode configured as mentioned above makes it possible to achieve a lithium ion secondary battery which exhibits greater charge/discharge rate characteristics.

In addition, the sum SE of the surface area of the positive electrode active material and the surface area of the conduction aid is preferably 150 $cm^2/cm^2$ or more and 300 $cm^2/cm^2$ or less per unit coated area of the positive electrode combination material.

The use of the positive electrode configured as mentioned above can achieve a lithium ion secondary battery which achieves a high level of balance between great charge/discharge rate characteristics and inhibited oxidative decomposition of a non-aqueous electrolytic solution at the positive electrode surface.

In addition, the positive electrode active material is preferably a spinel-type lithium-nickel-manganese oxide of a composition formula $Li_{1+a}[Mn_{2-a-x-y}Ni_xM_y]O_4$ ($0 \leq a \leq 0.3$, $0.4 \leq x \leq 0.6$, $0 \leq y \leq 0.3$, M represents at least one of metal elements containing Ti).

The use of the positive electrode configured as mentioned above can achieve a lithium ion secondary battery which is capable of inhibiting oxidative composition of the non-aqueous electrolytic solution at a higher level.

Furthermore, a lithium ion secondary battery according to the present invention characteristically includes the above-mentioned positive electrode according to the present invention, a negative electrode, and a non-aqueous electrolytic solution.

A positive electrode for a lithium ion secondary battery according to the present invention configured as described above makes it possible to exhibit great charge/discharge characteristics even when non-graphitizable carbon is used as the conduction aid, and inhibit oxidative decomposition of a non-aqueous electrolytic solution at the positive electrode surface, thereby suppressing cell bulge due to gas generation. Accordingly, according to the present invention, a positive electrode for a lithium ion secondary battery can be provided which is capable of achieving a balance between improved charge/discharge rates and inhibited oxidative decomposition of a non-aqueous electrolytic solution.

It is to be noted that the SC1/SC2 of less than results in an insufficient area of contact between the positive electrode active material and the first conduction aid (carbon black) with great electron conductivity in the positive electrode combination material, thereby decreasing the electron conductivity of the positive electrode combination material, and thus degrading the charge/discharge rate characteristics.

Alternatively, the SC1/SC2 in excess of 70 excessively increases the ratio of the first conduction aid (carbon black) in the conduction aid, thereby unfavorably increasing the area of contact between the conduction aid and the non-aqueous electrolytic solution, causing oxidative decomposition of the non-aqueous electrolytic solution to proceed significantly at the surface of the positive electrode combination material, and generating a large amount of gas.

In addition, when the sum of the surface area of the positive electrode active material and the surface area of the conduction aid per unit coated area of the positive electrode combination material is less than 90 $cm^2/cm^2$, the insufficient area of contact between the positive electrode combination material and the non-aqueous electrolytic solution unfavorably fails to cause an electrochemical reaction to proceed smoothly at the interface between the positive electrode combination material and the non-aqueous electrolytic solution, thereby degrading charge/discharge rate characteristics.

Alternatively, when the sum of the surface area of the positive electrode active material and the surface area of the conduction aid per unit coated area of the positive electrode combination material exceeds 400 $cm^2/cm^2$, the excessively increased area of contact between the positive electrode combination material and the non-aqueous electrolytic solution unfavorably causes oxidative decomposition of the non-aqueous electrolytic solution to proceed significantly at the surface of the positive electrode combination material, thereby generating a large amount of gas.

In addition, the lithium ion secondary battery according to the present invention includes the above-mentioned positive electrode according to the present invention, the negative electrode, and the non-aqueous electrolytic solution, thus making it possible to provide a lithium ion secondary battery which achieves a balance between great charge/discharge rate characteristics and inhibited oxidative decomposition of the non-aqueous electrolytic solution at the positive electrode surface, and has a high operating voltage and a high energy density.

It is to be noted that in accordance with the present invention, the surface area SA of the positive electrode active material [$cm^2/cm^2$] refers to a value obtained from the formula (1):

Surface Area SA of Positive Electrode Active Material [$cm^2/cm^2$]=Weight of Positive Electrode Active Material included per Unit Coated Area of Positive Electrode Combination Material [$mg/cm^2$]×BET Specific Surface Area of Positive Electrode Active Material [$m^2/g$]×10     (1)

In addition, the surface area SC1 of the first conduction aid [$cm^2/cm^2$] refers to a value obtained from the formula (2):

Surface Area SC1 of First Conduction Aid [$cm^2/cm^2$]=Weight of First Conduction Aid included per Unit Coated Area of Positive Electrode Combination Material [$mg/cm^2$]×BET Specific Surface Area of First Conduction Aid [$m^2/g$]×10     (2)

In addition, the surface area SC2 of the second conduction aid [$cm^2/cm^2$] refers to a value obtained from the formula (3):

Surface Area SC2 of Second Conduction Aid [$cm^2/cm^2$]=Weight of Second Conduction Aid included per Unit Coated Area of Positive Electrode Combination Material [$mg/cm^2$]×BET Specific Surface Area of Second Conduction Aid [$m^2/g$]×10     (3)

In addition, the ratio (SC1/SC2) of surface area SC1 of the first conduction aid in the positive electrode combination material to the surface area SC2 of the second conduction aid therein refers to a value obtained from the formula (4).

(SC1/SC2)=Surface Area SC1 of First Conduction Aid/Surface Area SC2 of Second Conduction Aid     (4)

In addition, the surface area SC of the conduction aid [$cm^2/cm^2$] refers to a value obtained from the formula (5):

Surface Area SC of Conduction Aid [$cm^2/cm^2$]=Surface Area SC1 of First Conduction Aid+Surface Area SC2 of Second Conduction Aid     (5)

In addition, the sum SE of the surface area SA of the positive electrode active material in the positive electrode combination material and the surface area SC of the conduction aid therein refers to a value obtained from the formula (6):

Sum (SE) of Surface Area of Positive Electrode Active Material in Positive Electrode Combination Material and surface Area of Conduction Aid therein [$cm^2/cm^2$]=Surface Area SA of Positive Electrode Active Material+Surface Area SC1 of First Conduction Aid+Surface Area SC2 of Second Conduction Aid     (6)

In addition, the ratio (SC/SA) of the surface area SC of the conduction aid to the surface area SA of the positive electrode active material refers to a value obtained from the formula (7):

(SC/SA)=Surface Area SC of Conduction Aid/Surface Area SA of Positive Electrode Active Material     (7)

DETAILED DESCRIPTION OF THE INVENTION

A positive electrode for a lithium ion secondary battery according to an embodiment of the present invention, and an embodiment of a lithium ion secondary battery using the positive electrode will be described below.

The positive electrode for a lithium ion secondary battery according to an embodiment of the present invention includes a positive electrode active material that produces a potential of 4.5 V or higher on the basis of metal lithium, a conduction aid, and a binder.

In the positive electrode for a lithium ion secondary battery, the positive electrode active material that produces a potential of 4.5 V or higher on the basis of metal lithium is not particularly limited, but spinel-type lithium-manganese oxides such as $LiNi_{0.5}Mn_{1.5}O_4$ and $LiCoMnO_4$, inverse-spinel type lithium-vanadium oxides such as $LiNiVO_4$, polyanion compounds such as $LiCoPO_4$ and $LiNiPO_4$ can be used.

Among these compounds, from the standpoints of charge/discharge stability and charge/discharge capacity at a potential of 4.5 V or higher, the positive electrode active material is preferably a spinel-type lithium-nickel-manganese oxide. Furthermore, the positive electrode active material is more preferably a spinel-type lithium-nickel-manganese oxide represented by the composition formula $Li_{1+a}[Mn_{2-a-x-y}Ni_xM_y]O_4$ ($0 \leq a \leq 0.3$, $0.4 \leq x \leq 0.6$, $0 \leq y \leq 0.3$, M represents at least one of metal elements containing Ti).

In the positive electrode for a lithium ion secondary battery, the conduction aid includes a first conduction aid composed of carbon black and a second conduction aid composed of non-graphitizable carbon.

The type of the carbon black is not particularly limited, but acetylene black, thermal black, Ketjen black, furnace black, and the like can be used.

As the conduct ion aid, conduction aids other than the carbon black and the non-graphitizable carbon may be further included. The conduction aids other than the carbon black and the non-graphitizable carbon include vapor-grown carbon fibers (VGCF), carbon tubes, graphite, graphitizable carbon, graphene, and metal powders.

In the positive electrode for a lithium ion secondary battery, the binder is not particularly limited, but various types of resins can be used, such as polyvinylidene fluoride, polytetrafluoroethylene, polyolefin, polyacrylic acid, carboxymethyl cellulose, styrene-butadiene rubbers, polyimide, polyamideimide, and polyacrylonitrile.

The foregoing positive electrode active material, conduction aid, and binder are used to prepare the positive electrode for a lithium ion secondary battery according to an embodiment of the present invention.

The positive electrode active material, the first conduction aid composed of the carbon black, the second conduction aid composed of the non-graphitizable carbon, and the binder are weighed and mixed such that the ratio (SC1/SC2) of the surface area SC1 of the first conduction aid in the positive electrode combination material to the surface area SC2 of the second conduction aid therein is 6.5 or more and 70 or less.

A solvent that dissolves the binder is added thereto, and mixed therewith, thereby providing a slurry form. This slurry is applied onto a current collector through the control of the application amount such that the sum SE of the surface area SA of the positive electrode active material and the surface area SC of the conduction aid in the positive electrode combination material is 90 $cm^2/cm^2$ or more and 400 $cm^2/cm^2$ or less per unit coated area of the positive electrode combination material, and dried, thereby forming a positive electrode combination material layer. If necessary, pressure forming such as pressing, and cutting are carried out, thereby preparing the positive electrode.

For the solvent that dissolves the binder, N-methyl-2-pyrrolidone, toluene, tetrahydrofuran, cyclohexane, methyl ethyl ketone, and the like can be used as an organic solvent. In the case of using a water-soluble binder for the binder, water can be also used as the solvent.

The current collector of the positive electrode is not particularly limited, but for example, foil, an expanded metal, a punching metal, a mesh, or the like of aluminum, stainless steel, titanium, nickel, or alloy thereof can be used, and in particular, aluminum foil is preferred.

A lithium ion secondary battery according to an embodiment of the present invention as described below can be prepared with the use of the thus prepared positive electrode according to an embodiment of the present invention, a negative electrode, and a non-aqueous electrolytic solution.

The following can be used as the negative electrode for use in the lithium ion secondary battery.

It is possible to use any negative electrode active material without any particular limitation, as long as the material electrochemically reacts with lithium ions, and examples of the material include carbon materials such as natural graphite, artificial graphite, graphitizable carbon, and non-graphitizable carbon, alloy-based negative electrodes such as silicon and tin, oxides such as lithium titanate, titanium oxide, silicon oxide, and tin oxide, and metal lithium. One of these materials may be used alone, or two or more thereof may be used in combination.

In the case of preparing the negative electrode, first, the negative electrode active material mentioned above, the same binder as in the case of the previously described positive electrode, a solvent that dissolves the binder, and if necessary, the same conduction aids as in the case of the positive electrode are added and mixed, thereby providing a slurry form. This slurry is applied onto a current collector, and dried to form a negative electrode combination material layer. If necessary, pressure molding such as pressing, and cutting are carried out, thereby preparing the negative electrode.

The current collector used for the negative electrode is not particularly limited, but for example, foil, an expanded metal, a punching metal, a mesh, or the like of copper, stainless steel, titanium, nickel, or alloy thereof can be used. In particular, copper foil is preferably used.

A solution including an electrolyte salt and an organic solvent is used as the non-aqueous electrolytic solution for use in the lithium ion secondary battery according to this embodiment.

In addition, the electrolyte salt is also not particularly limited, but it is possible to use, for example, $LiPF_6$, $LiClO_4$, $LiBF_4$, $LiCF_3SO_3$, $Li(CF_3SO_2)_2N$, $Li(C_2F_5SO_2)_2N$, $Li(CF_3)_2N$, and $LiB(CN)_4$, and one of these salts may be used alone, or two or more thereof may be used in combination. The electrolyte salt concentration in the non-aqueous electrolytic solution is desirably 0.3 to 4 mol/L.

In addition, the organic solvent is also not particularly limited, but carbonate-type solvents, lactone-type solvents, sulfone-type solvents, nitrile-type solvents, ester-type solvents, ether-type solvents, and the like can be used. In addition, for the purpose of improving the oxidation resistance of these solvents, the solvents partially substituted with an element that is high in electronegativity, such as fluorine, may be also used. One of these solvents may be used alone, or two or more thereof may be used in combination.

In addition, for the purpose of improving the oxidation resistance of the non-aqueous electrolytic solution, or for the purpose of forming, on the surface of the positive electrode or the negative electrode, a protective film that inhibits the decomposition of the non-aqueous electrolytic solution, various types of additives may be added, if necessary. The additives include additives that dissolve in organic solvents or also serve as an organic solvents, e.g., carbonate-type compounds such as vinylene carbonate and fluoro-ethylene carbonate, sulfur-type compounds such as 1,3-propanesultone, and lithium salts such as lithium bis(oxalate)borate.

The lithium ion secondary battery according to an embodiment of the present invention can be prepared by using the positive electrode, negative electrode, and non-aqueous electrolytic solution described above.

Features of the present invention will be described in more detail below with reference to more specific embodiments of the present invention.

[1] Positive Electrode Active Material (1-1) Positive Electrode Active Material 1

A lithium carbonate ($Li_2CO_3$) as a lithium-containing raw material, a nickel hydroxide ($Ni(OH)_2$) as a nickel-containing raw material, trimanganese tetraoxide ($Mn_3O_4$) as a manganese-containing raw material, and an anatase-type titanium oxide ($TiO_2$) as a titanium-containing raw material were prepared, and these raw materials were weighed so as to meet a predetermined composition ratio.

The weighed raw materials were raided with a ball mill with the use of water for a solvent and zirconia balls of 5 mm in diameter, thereby preparing slurry. This slurry was subjected to spray drying, thereby providing a dried powder.

Then, the dried powder obtained was put in a sagger containing alumina as its main constituent, and subjected to firing for 10 hours at a temperature of 1050° C. in the atmosphere, and then firing for 20 hours at a temperature of 700° C. in the atmosphere. This fired product was subjected to grinding in a mortar, thereby providing a positive electrode active material 1.

This positive electrode active material 1 was subjected to composition analysis by inductively-coupled plasma atomic emission spectroscopy (ICP-AES), and the specific surface area of the material was measured by a BET method.

Furthermore, the average particle size ($D50$) was measured with a laser diffraction-scattering type particle size distribution meter.

The results are shown in Table 1.

(1-2) Positive Electrode Active Material 2

A lithium carbonate ($Li_2CO_3$) as a lithium-containing raw material, a nickel hydroxide ($Ni(OH)_2$) as a nickel-containing raw material, and trimanganese tetraoxide ($Mn_3O_4$) as a manganese-containing raw material were prepared, and these raw materials were weighed so as to meet a predetermined composition ratio.

The weighed raw materials were mixed with a ball mill with the use of water for a solvent and zirconia balls of 5 mm in diameter, thereby preparing slurry. The obtained slurry was subjected to spray drying, thereby providing a dried powder.

Then, the dried powder obtained was put in a sagger containing alumina as its main constituent, and subjected to firing for 10 hours at a temperature of 1000° C. in the atmosphere, and then firing for 20 hours at a temperature of 700° C. in the atmosphere. This fired product was subjected to grinding in a mortar, thereby providing a positive electrode active material 2.

For this positive electrode active material 2, the composition, specific surface area, and average particle size ($D_{50}$) were checked by the same methods as in the case of the positive electrode active material 1 described above.

The results are shown together in Table 1.

TABLE 1

| | Composition | Specific Surface Area ($m^2/g$) | Average Particle Size ($\mu m$) |
|---|---|---|---|
| Positive Electrode Active Material 1 | $Li_{1.1}[Ni_{0.45}Mn_{1.35}Ti_{0.2}]O_4$ | 0.30 | 17 |
| Positive Electrode Active Material 2 | $Li_{1.05}[Ni_{0.5}Mn_{1.5}]O_4$ | 0.48 | 9 |

[2] Conduction Aid (2-1) First Conduction Aid (Carbon Black)

Carbon black 1, carbon black 2, and carbon black 3 in Table 2 were prepared as the first conduction aid.

Then, the specific surface areas were checked by the same method as in the case of the positive electrode active material 1 described above. In addition, the respective carbon black 1, carbon black 2, and carbon black 3 were observed with an electron microscope, thereby checking particle sizes, and the arithmetic mean was obtained, thereby providing the average particle sixes.

The results are shown in Table 2.

TABLE 2

| | Specific Surface Area ($m^2/g$) | Average Particle Size (nm) |
|---|---|---|
| Carbon Black 1 | 91 | 28 |
| Carbon Black 2 | 42 | 43 |
| Carbon Black 3 | 19 | 93 |

(2-2) Second Conduction Aid (Non-Graphitizable Carbon)

Non-graphitizable carbon 1, non-graphitizable carbon 2, and non-graphitizable carbon 3 in Table 3 were prepared as the second conduction aid.

Then, the specific surface areas and the average particle sizes were checked by the same methods as in the case of the positive electrode active material 1 described above. The results are shown in Table 3.

TABLE 3

| | Specific Surface Area ($m^2/g$) | Average Particle Size ($\mu m$) |
|---|---|---|
| Non-Grpahitizable Carbon 1 | 8.9 | 4 |
| Non-Graphitizable Carbon 2 | 4.6 | 6 |
| Non-Graphitizable Carbon 3 | 1.9 | 15 |

[3] Preparation of Positive Electrode

The positive electrode active material, carbon black, and non-graphitizable carbon described above, and a polyvinylidene fluoride as a binder were mixed in ratio by weight with the materials in accordance with the specifications shown in Tables 4A and 4B, and N-methyl-2-pyrrolidone was added to the mixtures, thereby preparing positive electrode combination material slurry.

The positive electrode combination material slurry was applied to one or both sides of aluminum foil of 15 μm in thickness as a positive electrode current collectors, such that the weight per unit coated area of the positive electrode active material included in the dried positive electrode combination material was approximately 16 mg/cm² per side.

Then, the slurry was dried at a temperature of 140° C., and thereafter, subjected to pressing by roll press such that the positive electrode combination material density fell within the range of 2.7 to 3.0 g/cm³, thereby preparing positive electrodes (samples) according to Examples 1 to 17 in Table 4A and positive electrodes (samples) according to Comparative Examples 1 to 13 in Table 4B.

It is to be noted that the area coated with the positive electrode combination material refers to the area of a part with the positive electrode combination material applied to the surface of the positive electrode current collector, and for example, the area coated with the positive electrode combination material is 10 cm² when the positive electrode combination material is applied entirely to one side of the 10 cm² positive electrode current collector, whereas the area coated with the positive electrode combination material is 20 cm² when the positive electrode combination material is applied entirely to both sides thereof.

Then, 1) the surface area SA of the positive electrode active material, 2) the surface area SC1 of the first conduction aid, and 3) the surface area SC2 of the second conduction aid were checked for each sample.

The respective surface areas SA, SC1, and SC2 mentioned above were obtained from the formulae (1), (2), and (3) with the use of the weight (mg/cm$^2$) for each of the positive electrode active material and first and second conduction aids included per unit coated area of the positive electrode combination material, and the values of the specific surface areas (m$^2$/g) of the respective materials, obtained by a BET method.

1) Surface Area SA of Positive Electrode Active Material

Surface Area SA of Positive Electrode Active Material [cm$^2$/cm$^2$]=Weight of Positive Electrode Active Material included per Unit Coated Area of Positive Electrode Combination Material [mg/cm$^2$]×BET Specific Surface Area of Positive Electrode Active Material [m$^2$/g]×10  (1)

2) Surface Area SC1 of First Conduction Aid [cm$^2$/cm$^2$]

Surface Area SC1 of First Conduction Aid [cm$^2$/cm$^2$]=Weight of First Conduction Aid included per Unit Coated Area of Positive Electrode Combination Material [mg/cm$^2$]×BET Specific Surface Area of First conduction Aid [m$^2$/g]×10  (2)

3) Surface Area SC2 of Second Conduction Aid

Surface Area SC2 of Second Conduction Aid [cm$^2$/cm$^2$]=Weight of Second Conduction Aid included per Unit Coated Area of Positive Electrode Combination Material [mg/cm$^2$]×BET Specific Surface Area of Second Conduction Aid [mg$^2$/g]×10  (3)

In addition, for each sample, 4) SC1/SC2, 5) the surface area SC of the conduction aid, 6) the sum SE of the surface area of the positive electrode active material in the positive electrode combination material and the surface area of the conduction aid therein, and 7) the ratio (SC/SA) of the surface area SC of the conduction aid to the surface area SA of the positive electrode active material were obtained from the formulae (4), (5), (6), and (7).

4) SC1/SC2

(SC1/SC2) Surface Area SC1 of First Conduction Aid/Surface Area SC2 of Second Conduction Aid  (4)

5) Surface Area SC of Conduction Aid

Surface Area SC of Conduction Aid [cm$^2$/cm$^2$]=Surface Area SC1 of First Conduction Aid+Surface Area SC2 of Second Conduction Aid  (5)

6) Sum SE of Surface Area of Positive Electrode Active Material in Positive Electrode Combination Material and Surface Area of Conduction Aid therein Sum (SE) of Surface Area of Positive Electrode-Active Material in Positive Electrode Combination Material and Surface Area of Conduction Aid therein [cm$^2$/cm$^2$]=Surface Area SA of Positive Electrode Active Material+Surface Area SC1 of First Conduction Aid+Surface Area SC2 of Second Conduction Aid  (6)

7) Ratio (SC/SA) of Surface Area SC of Conduction Aid to Surface Area SA of Positive Electrode Active Material (SC/SA)=Surface Area SC of Conduction Aid/Surface Area SA of Positive Electrode Active Material  (7)

[4] Preparation of Negative Electrode for Wound Battery

Graphite as a negative electrode active material and polyvinylidene fluoride as a binder were mixed in proportions at 92.5:7.5 in ratio by weight, and N-methyl-2-pyrrolidone was added to the mixture, thereby preparing negative electrode combination material slurry.

This negative electrode combination material slurry was applied to both sides of electrolytic copper foil of 10 μm in thickness as a negative electrode current collector, such that the weight per unit coated area of the negative electrode active material included in the dried negative electrode combination material was approximately 7 mg/cm$^2$ per side.

Then, the negative electrode combination material slurry applied was dried at a temperature of 140° C., and thereafter, subjected to pressing by roll press such that the negative electrode combination material density fell within the range of 1.0 to 1.3 g/cm$^3$. The pressed negative electrode was cut out into a strip shape of 44 m×460 mm, and a nickel tab is welded thereto, thereby preparing a negative electrode for a wound battery.

[5] Preparation of Coin Battery (Coin-Type Lithium Ion Secondary Battery)

The positive electrode with the positive electrode combination material applied to one side was subjected to punching into a disc of 1.2 mm in diameter as a positive electrode for a coin battery.

Disc-like metal lithium of 15 mm in diameter was attached to a stainless-steel current collecting plate of 15 mm in diameter as a negative electrode for a coin battery.

For a separator, a glass filter (Trade Name "ADVANTEC GA-100") of 16 mm in diameter was used.

For an electrolytic solution, 1M LiPF$_6$ ethylene carbonate (EC):ethylmethyl carbonate (EMC)=1:3 (volume ratio) was used.

Then, the above-mentioned positive electrode for a coin battery, negative electrode for a coin battery, separator, and electrolytic solution were used to prepare a coin battery.

It is to be noted that this coin battery is a sample prepared to carry out a charge/discharge rate test as described later and check the 3C charge retention rate [%] and the 3C discharge retention rate [%].

[6] Preparation of Wound Battery (Wound Lithium Ion Secondary Battery)

The positive electrode with the positive electrode combination material applied to both sides was cut out into a strip of 42 mm×370 mm, with an aluminum tab welded thereto, thereby preparing a positive electrode for a wound battery.

For a separator, a polyethylene microporous membrane of 15 μm in thickness was used.

Then, the above-mentioned positive electrode for a wound battery, the negative electrode for a wound battery, prepared in accordance with the section [4], and the separator were wound with a winding machine, thereby preparing a wound body. For an electrolytic solution, 1M LiPF$_6$ EC:EMC=1:3 (volume ratio) was used. For an outer package, an aluminum laminate was used.

Then, the wound body, the electrolytic solution, and the outer package were used to prepare a wound battery (wound lithium ion secondary battery)

It is to be noted that this wound battery is a sample prepared to carry out a constant-voltage charging test as described later and measure the amount of gas generation. It is to be noted that the same positive electrode as in the coin battery described above is used in this wound battery.

[7] Charge/Discharge Rate Test for Coin Battery

For the coin battery prepared in the way described above, the positive electrode was subjected to the charge/discharge rate test. In a thermostatic bath at 25° C., 3 cycles of charge/discharge were carried out at a current value of 0.45 mA/cm$^2$ in a voltage range of 3.0 to 5.0 V. The charge capacity and discharge capacity of the third cycle were respectively regarded as "0.2 C charge capacity" and "0.2 C discharge capacity". Thereafter, the charge capacity in the case of charging up to 5.0 V at a current value of 6.78 mA/cm² was regarded as a "3C charge capacity". Thereafter, in the case of leaving the open circuit for 10 minutes, charging up to 5.0 V at a current value of 0.45 mA/cm² and discharging down to 3.0 V at a current value of 6.78 mA/cm², the discharge capacity was regarded as a "3C discharge capacity". The "3C charge retention rate" was calculated from the formula (8), whereas the "3C discharge retention rate" was calculated from the formula (9).

$$\text{3C Charge Retention Rate [\%]} = \{(\text{3C Charge Capacity})/(0.2\text{ C Charge Capacity})\} \times 100 \quad (8)$$

$$\text{3C Discharge Retention Rate [\%]} = \{(\text{3C Discharge Capacity})/(0.2\text{ C Discharge Capacity})\} \times 100 \quad (9)$$

[8] Constant-Voltage Charging Test for Wound Battery

The wound battery prepared in the way described above was subjected to the constant-voltage charging test, and the amount of gas generation was measured from the volume change of the cell between before and after the test.

In a thermostatic bath at 45° C., the battery was subjected to constant-voltage charging for 168 hours at 4.9 V, immediately after charging up to 4.9 V at a current value of 100 mA. After the charging, the battery was discharged down to 3.0 V at a current value of 100 mA. The volumes of the cell before and after the constant-voltage charging test were measured by an Archimedes method, and the amount of gas generation was calculated from the formula (10).

$$\text{The Amount of Gas Generation [mL]} = (\text{Volume of Cell after Constant-Voltage Charging Test}) - (\text{Volume of Cell before Constant-Voltage Charging Test}) \quad (10)$$

<Evaluation of Positive Electrode With Positive Electrode Active Material 1>

Tables 4A and 4B show the materials used for the positive electrode combination material, and the ratios of the materials by weight, SC1/SC2, SE, SC/SA, the 3C charge retention rate, the 3C discharge retention rate, and the amount of gas generation in the case of using the above-described positive electrode active material 1 (see Table 1) for the positive electrode active material.

It is to be noted that as for the data on the positive electrodes according to Examples 1 to 17 in Table 4A and the respective positive electrodes according to Comparative Examples 1 to 13 in Table 4B, the 3C charge retention rate [%] and the 3C discharge retention rate [%] refer to data obtained with, as samples, coin batteries prepared in the way described above, and the amount of gas generation refers to data obtained with, as samples, wound batteries as described above, prepared with the use of positive electrodes under the same conditions as for the above-described coin batteries checked on the 3C charge retention rates and the 3C discharge retention rates.

TABLE 4A

| Type of Positive Electrode | Positive Electrode Active Material in Ratio by Weight (%) Positive Active Material 1 | Carbon Black in Ratio by Weight (%) | | | Non-Graphitizable Carbon in Ratio by Weight (%) | | |
|---|---|---|---|---|---|---|---|
| | | Carbon Black 1 | Carbon Black 2 | Carbon Black 3 | Non-Graphitizable Carbon 1 | Non-Graphitizable Carbon 2 | Non-Graphitizable Carbon 3 |
| Example 1 | 88 | 0 | 2.5 | 0 | 0 | 3.5 | 0 |
| Example 2 | | 0 | 5 | 0 | 0 | 1 | 0 |
| Example 3 | | 1.5 | 0 | 0 | 0 | 4.5 | 0 |
| Example 4 | | 2 | 0 | 0 | 0 | 4 | 0 |
| Example 5 | | 0 | 0 | 5 | 0 | 1 | 0 |
| Example 6 | | 0 | 3.5 | 0 | 2.5 | 0 | 0 |
| Example 7 | | 0 | 5 | 0 | 1 | 0 | 0 |
| Example 8 | | 0 | 4.5 | 0 | 0 | 0 | 1.5 |
| Example 9 | | 0 | 1.5 | 0 | 0 | 0 | 4.5 |
| Example 10 | | 1.5 | 0 | 0 | 0 | 0 | 4.5 |
| Example 11 | | 2 | 0 | 0 | 0 | 0 | 4 |
| Example 12 | | 0 | 0 | 5 | 1 | 0 | 0 |
| Example 13 | | 0 | 0 | 5 | 0 | 0 | 1 |
| Example 14 | 94 | 0 | 1 | 0 | 0 | 1 | 0 |
| Example 15 | | 0 | 0 | 1.5 | 0 | 0.5 | 0 |
| Example 16 | | 0 | 1.5 | 0 | 0 | 0 | 0.5 |
| Example 17 | | 0 | 0 | 1.5 | 0 | 0 | 0.5 |

| Type of Positive Electrode | Binder in Ratio by Weight (%) Polyvinylidene Fluoride | SC1/SC2 | SE (cm²/cm²) | SC/SA | 3C Charge Retention Rate (%) | 3c Discharge Retention Rate (%) | Amount of Gas Generation (mL) |
|---|---|---|---|---|---|---|---|
| Example 1 | 6 | | 6.5 | 236 | 4.59 | 78 | 61 | 20.9 |
| Example 2 | | 46 | 386 | 8.13 | 80 | 61 | 29.2 |
| Example 3 | | 6.6 | 294 | 5.95 | 80 | 58 | 24.5 |
| Example 4 | | 9.9 | 363 | 7.59 | 83 | 61 | 28.8 |
| Example 5 | | 21 | 202 | 3.77 | 77 | 58 | 18.8 |
| Example 6 | | 6.6 | 313 | 6.41 | 78 | 60 | 25.7 |
| Example 7 | | 24 | 392 | 8.29 | 78 | 59 | 29.6 |

TABLE 4A-continued

| | | | | | | | |
|---|---|---|---|---|---|---|---|
| Example 8 | | 66 | 349 | 7.27 | 77 | 59 | 27.9 |
| Example 9 | | 7.4 | 157 | 2.71 | 71 | 56 | 16.0 |
| Example 10 | | 16 | 274 | 5.49 | 77 | 58 | 23.3 |
| Example 11 | | 24 | 346 | 7.18 | 81 | 61 | 27.7 |
| Example 12 | | 11 | 208 | 3.94 | 75 | 57 | 19.2 |
| Example 13 | | 50 | 197 | 3.67 | 74 | 57 | 18.5 |
| Example 14 | 4 | 9.1 | 120 | 1.65 | 63 | 45 | 13.7 |
| Example 15 | | 12 | 94 | 1.09 | 64 | 47 | 12.2 |
| Example 16 | | 66 | 147 | 2.27 | 67 | 49 | 15.4 |
| Example 17 | | 30 | 92 | 1.04 | 64 | 47 | 12.0 |

TABLE 4B

| Type of Positive Electrode | Positive Electrode Active Material in Ratio by Weight (%) Positive Electrode Active Material 1 | Carbon Black in Ratio by Weight (%) | | | Non-Graphitizable Carbon in Ratio by Weight (%) | | |
|---|---|---|---|---|---|---|---|
| | | Carbon Black 1 | Carbon Black 2 | Carbon Black 3 | Non-Graphitizable Carbon 1 | Non-Graphitizable Carbon 2 | Non-Graphitizable Carbon 3 |
| Comparative Example 1 | 88 | 0 | 6 | 0 | 0 | 0 | 0 |
| Comparative Example 2 | | 0 | 0 | 0 | 0 | 6 | 0 |
| Comparative Example 3 | | 4.5 | 0 | 0 | 0 | 1.5 | 0 |
| Comparative Example 4 | | 0 | 5 | 0 | 0 | 0 | 1 |
| Comparative Example 5 | | 2 | 0 | 0 | 4 | 0 | 0 |
| Comparative Example 6 | | 2.5 | 0 | 0 | 3.5 | 0 | 0 |
| Comparative Example 7 | | 4.5 | 0 | 0 | 0 | 0 | 1.5 |
| Comparative Example 8 | | 3 | 0 | 0 | 0 | 0 | 3 |
| Comparative Example 9 | | 0.5 | 0 | 0 | 5.5 | 0 | 0 |
| Comparative Example 10 | | 0 | 0 | 0.5 | 5.5 | 0 | 0 |
| Comparative Example 11 | 94 | 0 | 0.5 | 0 | 0 | 1.5 | 0 |
| Comparative Example 12 | | 0 | 0.5 | 0 | 0 | 0 | 1.5 |
| Comparative Example 13 | | 0 | 0 | 0.5 | 0 | 0 | 1.5 |

| Type of Positive Electrode | Binder in Ratio by Weight (%) Polyvinylidene Fluoride | SC1/SC2 | SE (cm²/cm²) | SC/SA | 3C Charge Retention Rate (%) | 3c Discharge Retention Rate (%) | Amount of Gas Generation (mL) |
|---|---|---|---|---|---|---|---|
| Comparative Example 1 | 6 | — | 445 | 9.55 | 80 | 64 | 33.9 |
| Comparative Example 2 | | 0 | 86 | 1.05 | 19 | 8 | 11.7 |
| Comparative Example 3 | | 59 | 708 | 15.8 | 87 | 61 | 50.1 |
| Comparative Example 4 | | 111 | 381 | 8.03 | 77 | 59 | 29.9 |
| Comparative Example 5 | | 5.1 | 390 | 8.24 | 81 | 61 | 30.5 |
| Comparative Example 6 | | 7.3 | 456 | 9.80 | 83 | 62 | 34.5 |
| Comparative Example 7 | | 144 | 702 | 15.6 | 85 | 61 | 49.7 |
| Comparative Example 8 | | 48 | 488 | 10.6 | 84 | 63 | 36.5 |

TABLE 4B-continued

| | | | | | | | |
|---|---|---|---|---|---|---|---|
| Comparative Example 9 | | 0.9 | 193 | 3.58 | 47 | 31 | 18.3 |
| Comparative Example 10 | | 0.2 | 136 | 2.21 | 41 | 29 | 14.7 |
| Comparative Example 11 | 4 | 3.0 | 90 | 0.99 | 40 | 26 | 11.9 |
| Comparative Example 12 | | 7.4 | 83 | 0.85 | 40 | 26 | 11.5 |
| Comparative Example 13 | | 3.3 | 65 | 0.44 | 38 | 25 | 10.3 |

As shown in Table 4A, the positive electrodes according to Examples 1 to 17 each show great charge/discharge rate characteristics with the 3C charge retention rate of 60% or more and the 3C discharge retention rate of 40% or more, and at the same time, with the reduced amount of gas generation less than 30.0 mL. This is due to the fact that the SC1/SC2 of 6.5 or more and 70 or less and the SE of 90 cm²/cm² or more and 400 cm²/cm² or less have succeeded in achieving a balance between great charge/discharge rate characteristics and inhibited oxidative decomposition of the non-aqueous electrolytic solutions at the positive electrode surfaces.

In addition, it has been confirmed that the positive electrodes according to Examples 1 to 13 with the SC/SA of 2.6 or more and 10 or less and the SE of 150 cm²/cm² or more, thus show greater charge/discharge rate characteristics with the 3C charge retention rate of 70% or more and the 3C discharge retention rate of 50% or more, as compared with the positive electrodes according to Examples 14 to 17 with the SC/SA of less than 2.6.

Furthermore, it has been confirmed that the positive electrodes according to Examples 1, 3, 5, 9, 10, 12, and 13 with the SE of 300 cm²/cm² or more, thus maintain great charge/discharge rate characteristics with the 3C charge retention rate of 70% or more and the 3C discharge retention rate of 50% or more, and at the same time, with the reduced amount of gas generation less than 25.0 mL, as compared with the positive electrodes according to Examples 2, 4, 6 to 8, and 11, and can thus further reliably inhibit oxidative decomposition of the non-aqueous electrolytic solution at the positive electrode surfaces.

On the other hand, in the case of the positive electrodes according to Comparative Examples 1 to 13, which fail to meet at least one of the requirements of: SC1/SC2 of 6.5 or more and 70 or less and SE of 90 cm²/cm² or more and 400 cm²/cm² or less, it has been confirmed that unfavorable results for at least one of the charge/discharge rate characteristics and the amount of gas generation fail to achieve a balance between charge/discharge rate characteristics and inhibited oxidative decomposition of the non-aqueous electrolytic solutions.

<Evaluation of Positive Electrode With Positive Electrode Active Material 2>

Next, Table 5 shows the materials used for the positive electrode combination material, and the ratios of the materials by weight, SC1/SC2, SE, SC/SA, the 3C charge retention rate, the 3C discharge retention rate, and the amount of gas generation in the case of using the positive electrode active material 2 (see Table 1) for the positive electrode active material.

It is to be noted that as for the data on the positive electrodes according to Examples 18 to 20 and the respective positive electrodes according to Comparative Examples 14 to 18 in Table 5, the 3C charge retention rate [%] and the 3C discharge retention rate [%] refer to data obtained with, as samples, coin batteries prepared in the way described above, and the amount of gas generation refers to data obtained with, as samples, wound batteries as described above, prepared with the use of positive electrodes under the same conditions as for the above-described coin batteries checked on the 3C charge retention rates and the 3C discharge retention rates.

TABLE 5

| Type of Positive Electrode | Positive Electrode Active Material in Ratio by Weight (%) Positive Electrode Active Material 2 | Carbon Black in Ratio by Weight (%) Non-Carbon Black 2 | Non-Graphitizable Carbon in Ratio by Weight (%) Non-Graphitizable Carbon 2 | Binder in Ratio by Weight (%) Polyvinylidene Fluoride | SC1/SC2 | SE (cm²/cm²) | SC/SA | 3C Charge Retention Rate (%) | 3c Discharge Retention Rate (%) | Amount of Gas Generation (mL) |
|---|---|---|---|---|---|---|---|---|---|---|
| Example 18 | 86 | 4.5 | 3.5 | 6 | 12 | 394 | 4.97 | 80 | 55 | 35.7 |
| Example 19 | | 3.5 | 4.5 | | 7.1 | 334 | 4.06 | 80 | 56 | 30.3 |
| Example 20 | 92 | 1 | 1 | | 9.1 | 145 | 1.06 | 67 | 46 | 13.1 |
| Comparative Example 14 | 86 | 0 | 8 | | 0 | 125 | 0.89 | 19 | 8 | 11.3 |
| Comparative Example 15 | | 0.5 | 7.5 | | 0.6 | 155 | 1.34 | 44 | 28 | 14.0 |
| Comparative Example 16 | | 6 | 2 | | 27 | 484 | 6.33 | 81 | 59 | 43.9 |
| Comparative Example 17 | | 8 | 0 | | — | 604 | 8.14 | 82 | 59 | 54.7 |
| Comparative Example 18 | 92 | 0.4 | 1.6 | | 2.3 | 109 | 0.55 | 38 | 23 | 9.8 |

The positive electrodes according to Examples 18 to 20 each show great charge/discharge rate characteristics with the 3C charge retention rate of 60% or more and the 3C discharge retention rate of 40% or more, and at the same time, with the reduced amount of gas generation less than 40.0 mL. This is due to the fact that the SC1/SC2 of 6.5 or more and 70 or less and the SE of 90 cm$^2$/cm$^2$ or more and 400 cm$^2$/cm$^2$ or less have succeeded in achieving a balance between great charge/discharge rate characteristics and inhibited oxidative decomposition of the non-aqueous electrolytic solutions at the positive electrode surfaces.

In addition, the positive electrodes according to Examples 18 and 19 is further with the SC/SA of 2.6 or more and 10 or less and the SE of 150 cm$^2$/cm$^2$ or more, thus makes it possible to provide lithium ion secondary batteries which also have greater charge/discharge rate characteristics with the 3C charge retention rate of 80% or more and the 3C discharge retention rate of 55% or more, as compared with the positive electrodes according to Example 20 with the SC/SA of less than 2.6.

On the other hand, also in the case of the positive electrodes with the positive electrode active material 2, in the case of the positive electrodes according to Comparative Examples 14 to 18, which fail to meet at least one of the requirements of: SC1/SC2 of 6.5 or more and 70 or less and SE of 90 cm$^2$/cm$^2$ or more and 400 cm$^2$/cm$^2$ or less, it has been confirmed that unfavorable results for at least one of the charge/discharge rate characteristics and the amount of gas generation fail to achieve a balance between charge/discharge rate characteristics and inhibited oxidative decomposition of the non-aqueous electrolytic solutions.

The present invention is not limited to the embodiments described above, but various applications and modifications can be made within the scope of the invention, in regard to the types of the positive electrode active material, conduction aid, and binder constituting the positive electrode, the configuration of the negative electrode constituting the lithium ion secondary battery, the composition of the non-aqueous electrolytic solution, and the like.

The invention claimed is:

1. A positive electrode for a lithium ion secondary battery, comprising:
    a positive electrode combination material that includes:
        a positive electrode active material that produces a potential of 4.5 V or higher on the basis of metal lithium;
        a first conduction aid comprising carbon black;
        a second conduction aid comprising non-graphitizable carbon; and
        a binder,
    wherein a first ratio (SC1/SC2) of a surface area SC1 of the first conduction aid to a surface area SC2 of the second conduction aid is 6.5 to 70, and
    a sum SE of a surface area SA of the positive electrode active material, the surface area SC1 of the first conduction aid and the surface area SC2 of the second conduction aid is 90 cm$^2$/cm$^2$ to 400 cm$^2$/cm$^2$ per unit coated area of the positive electrode combination material.

2. The positive electrode for a lithium ion secondary battery according to claim 1, wherein a second ratio (SC/SA) of a sum SC of the surface area SC1 of the first conduction aid and the surface area SC2 of the second conduction aid to the surface area SA of the positive electrode active material is 2.5 to 10.

3. The positive electrode for a lithium ion secondary battery according to claim 2, wherein the sum SE is 150 cm$^2$/cm$^2$ to 300 cm$^2$/cm$^2$ or less per unit coated area of the positive electrode combination material.

4. The positive electrode for a lithium ion secondary battery according to claim 3, wherein the positive electrode active material is a spinel-type lithium-nickel-manganese oxide having a composition formula $Li_{1+a}[Mn_{2-a-x-y}Ni_xM_y]O_4$ wherein
    $0 \leq a \leq 0.3$,
    $0.4 \leq x \leq 0.6$,
    $0 \leq y \leq 0.3$, and
    M represents at least one of metal elements containing Ti.

5. The positive electrode for a lithium ion secondary battery according to claim 1, wherein the sum SE is 150 cm$^2$/cm$^2$ to 300 cm$^2$/cm$^2$ or less per unit coated area of the positive electrode combination material.

6. The positive electrode for a lithium ion secondary battery according to claim 5, wherein the positive electrode active material is a spinel-type lithium-nickel-manganese oxide having a composition formula $Li_{1+a}[Mn_{2-a-x-y}Ni_xM_y]O_4$ wherein
    $0 \leq a \leq 0.3$,
    $0.4 \leq x \leq 0.6$,
    $0 \leq y \leq 0.3$, and
    M represents at least one of metal elements containing Ti.

7. The positive electrode for a lithium ion secondary battery according to claim 1, wherein the positive electrode active material is a spinel-type lithium-nickel-manganese oxide having a composition formula $Li_{1+a}[Mn_{2-a-x-y}Ni_xM_y]O_4$ wherein
    $0 \leq a \leq 0.3$,
    $0.4 \leq x \leq 0.6$,
    $0 \leq y \leq 0.3$, and
    M represents at least one of metal elements containing Ti.

8. The positive electrode for a lithium ion secondary battery according to claim 1, wherein the carbon black is selected from acetylene black, thermal black, Ketjen black, and furnace black.

9. A lithium ion secondary battery comprising:
    the positive electrode according to claim 1;
    a negative electrode; and
    a non-aqueous electrolytic solution.

* * * * *